United States Patent
Oh et al.

(10) Patent No.: US 8,053,113 B2
(45) Date of Patent: Nov. 8, 2011

(54) COMPOSITE BINDER CONTAINING CARBON NANOTUBE AND LITHIUM SECONDARY BATTERY EMPLOYING THE SAME

(75) Inventors: Eun-Suok Oh, Daejeon (KR); Young-Min Kim, Daejeon (KR); Juhyun Kim, Seoul (KR); Minjung Ryu, Seoul (KR); SeungRim Yang, Gongju-si (KR)

(73) Assignee: LG Chem, Ltd. (KR)

( * ) Notice: Subject to any disclaimer, the term of this patent is extended or adjusted under 35 U.S.C. 154(b) by 1022 days.

(21) Appl. No.: 11/515,081

(22) Filed: Sep. 1, 2006

(65) Prior Publication Data

US 2007/0202403 A1 Aug. 30, 2007

(30) Foreign Application Priority Data

Sep. 6, 2005 (KR) .................. 10-2005-0082759

(51) Int. Cl.
*H01M 4/13* (2010.01)
(52) U.S. Cl. .................. 429/217; 429/212; 429/232
(58) Field of Classification Search .................. 429/217, 429/212, 232
See application file for complete search history.

(56) References Cited

U.S. PATENT DOCUMENTS

2003/0054249 A1* 3/2003 Yamamoto et al. ........ 429/231.1
2003/0077515 A1* 4/2003 Chen et al. .................. 429/231.8
2005/0042515 A1* 2/2005 Hwang et al. ............. 429/231.95
2006/0040182 A1* 2/2006 Kawakami et al. ......... 429/218.1

FOREIGN PATENT DOCUMENTS

| JP | 2004-319186 | | 11/2004 |
| JP | 2005-004974 | | 1/2005 |
| WO | WO 2004086539 A1 | * | 10/2004 |
| WO | 2005/011030 A1 | | 2/2005 |

OTHER PUBLICATIONS

Machine translation of JP 2004-319186 listed in applicant's IDS.*
Official translation of JP 2004-319186 listed in applicant's IDS.*

* cited by examiner

*Primary Examiner* — Barbara Gilliam
*Assistant Examiner* — Zachary Best
(74) *Attorney, Agent, or Firm* — Cantor Colburn LLP

(57) ABSTRACT

Provided is a nanocomposite binder for an electrode mix of a secondary battery, comprising carbon nanotubes in a photo- and/or thermo-polymerizable material or polymer, or a mixture thereof; and a lithium secondary battery comprising the same.

The carbon nanotube-containing composite binder according to the present invention and a lithium secondary battery comprising the same employs a novel nanocomposite, prepared by combination of carbon nanotubes with a conventional binder material, as a binder of an anode. As a result, the present invention provides advantages such as improved conductivity of the anode due to decreased electrical resistance of the binder, and enhanced mechanical properties of the binder and thereby being capable of preventing the separation of an anode active material layer from a current collector due to volume changes occurring upon charge/discharge cycles.

19 Claims, 1 Drawing Sheet

COMPOSITE BINDER CONTAINING CARBON NANOTUBE AND LITHIUM SECONDARY BATTERY EMPLOYING THE SAME

FIELD OF THE INVENTION

The present invention relates to a composite binder containing carbon nanotubes and a lithium secondary battery comprising the same. More specifically, the present invention relates to a composite binder containing carbon nanotubes, which is capable of achieving a high capacity and high-speed charging by using a nanocomposite composed of carbon nanotubes, known to exhibit superior electrical conductivity and mechanical properties, and a photo- or thermo-polymerizable material or polymer having adhesion properties, or a mixture thereof, as an anode binder; and a lithium secondary battery comprising the same.

BACKGROUND OF THE INVENTION

Technological development and increased demand for mobile equipment have led to a rapid increase in the demand for secondary batteries as an energy source. Among these secondary batteries, lithium secondary batteries having high energy density and voltage are commercially available and widely used. The lithium secondary batteries generally use a lithium transition metal oxide as a cathode active material and a graphite-based material as an anode active material.

However, the anode formed of the graphite-based material has a maximum theoretical capacity of only 372 mAh/g (844 mAh/cc), thus suffering from a limited increase of capacity thereof. Consequently, such a graphite-based anode is incapable of carrying out a sufficient role as an energy source for next-generation mobile equipment undergoing rapid development and advancement. Further, lithium metals, studied for use as the anode material, have a very high energy density and thus may realize a high capacity, but raise problems associated with safety concerns due to growth of dendrites and a shortened cycle life as the battery is repeatedly charged/discharged. In addition, carbon nanotubes (CNTs) have been used as an anode active material, but have suffered from problems such as low productivity, high costs and low initial efficiency of less than 50%.

In recent years, a number of studies and suggestions have been proposed as to silicon, tin or alloys thereof, as they are known to be capable of performing reversible absorption (intercalation) and desorption (deintercalation) of large amounts of lithium ions through the reaction with lithium. For example, silicon (Si) has a maximum theoretical capacity of about 4020 mAh/g (9800 mAh/cc, a specific gravity of 2.23) which is substantially greater than the graphite-based materials, and thereby is promising as a high-capacity anode material.

However, upon performing charge/discharge processes, silicon, tin or alloys thereof react with lithium, thus undergoing significant changes of volume, i.e., ranging from 200 to 300%, and thus repeated charge/discharge may result in separation of the anode active material from the current collector, or significant physicochemical changes at the contact interfaces between the anode active materials, which are accompanied by increased resistance. Therefore, as charge/discharge cycles are repeated, the battery capacity sharply drops, thus suffering from a shortened cycle life thereof. For these reasons, when a conventional binder for a graphite-based anode active material, without any special treatment or processing, is directly applied to a silicon- or tin-based anode active material, it is impossible to achieve desired effects. In addition, when an excessive amount of a polymer as the binder is used to decrease volume changes occurring upon charge/discharge cycles, the electrical resistance of the anode is increased by an electrical insulating polymer used as the binder, which consequently results in problems associated with a reduced battery capacity and a decreased charge/discharge speed.

In order to cope with such problems, there is an urgent need for the development of a binder having low electrical resistance while exhibiting adhesive strength and mechanical properties sufficient to withstand large volume changes of anode active materials occurring during a charge/discharge process in lithium secondary batteries using silicon- or tin-based anode active materials. In addition, conventional graphite-based lithium batteries also require high-speed charge capability via further enhanced conductivity of the binder.

On the other hand, as an attempt to use conventional carbon nanotubes as an anode mix (a mixture of an active material, a conductive material, a binder and the like) of a lithium secondary battery, Japanese Patent Laid-open Publication Nos. 2004-319186 and 2005-004974 disclose incorporation of the carbon nanotubes as the conductive material into the anode mix, thereby improving the conductivity of the anode. However, to the best of our knowledge, no case has been known to the art in which the carbon nanotubes were used as the binder of the anode mix. Furthermore, the carbon nanotubes are highly expensive materials, and therefore incorporation thereof in a content required as the conductive material into an electrode mix leads to the fundamental problem associated with significantly increased production costs of the batteries.

SUMMARY OF THE INVENTION

Therefore, it is one object of the present invention to solve the above problems and other technical problems that have yet to be resolved.

As a result of a variety of extensive and intensive studies and experiments to solve the problems as described above, the inventors of the present invention have developed a nanocomposite binder having superior adhesive strength and mechanical properties and high conductivity by dispersing carbon nanotubes, known to have superior electrical conductivity and mechanical strength, in a photo- or thermo-polymerizable material or polymer, or a mixture thereof.

It is another object of the present invention to provide a high-capacity lithium secondary battery which is capable of being charged at a high speed and can be used as an energy source of next-generation mobile equipment, by fabrication of an anode for a lithium secondary battery via the use of the above-mentioned binder in admixture with a silicon-, tin- or graphite-based anode active material.

BRIEF DESCRIPTION OF THE DRAWINGS

The above and other objects, features and other advantages of the present invention will be more clearly understood from the following detailed description taken in conjunction with the accompanying drawing, in which.

DETAILED DESCRIPTION OF PREFERRED EMBODIMENTS

Figure 1:
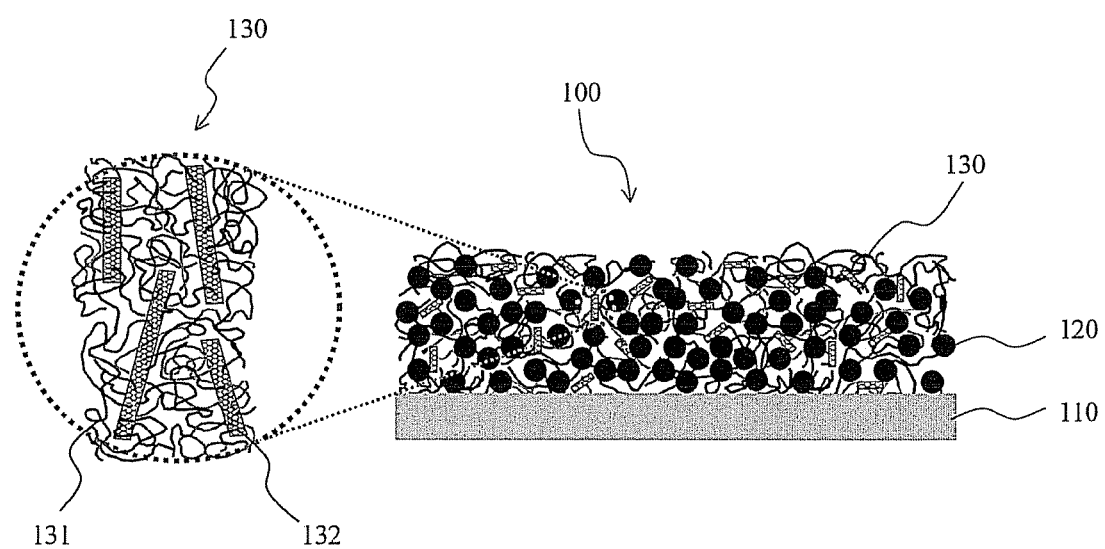
FIG. 1 is a schematic cross-sectional view showing a configuration of an anode to which a binder according to one embodiment of the present invention is applied.

In accordance with an aspect of the present invention, the above and other objects can be accomplished by the provision of a nanocomposite binder for an electrode mix of a secondary battery, comprising carbon nanotubes in a photo- and/or thermo-polymerizable material or polymer, or a mixture thereof. The photo- and/or thermo-polymerizable material refers to the concept encompassing any kind of monomers, oligomers, low-molecular weight polymers and mixtures thereof which are polymerizable by light irradiation and/or heat treatment.

In accordance with another aspect of the present invention, there is a provided lithium secondary battery comprising the above-mentioned nanocomposite binder.

The nanocomposite binder according to the present invention features remarkably improved mechanical strength of the binder since the polymer material and carbon nanotubes very strongly bind to form a composite and the carbon nanotubes themselves have high strength. Therefore, application of the binder according to the present invention enables stable maintenance of adhesion between silicon- or tin-based anode active materials undergoing significant volume changes during charge/discharge cycles of the battery and/or adhesion between the anode active material and current collector, thereby being capable of preventing volume changes upon charging/discharging the battery. Consequently, it is advantageously possible to provide a high-capacity lithium secondary battery having improved charge/discharge cycle characteristics and high-speed chargeability.

Further, the binders used in the lithium secondary batteries are generally included in the form of electrical insulating polymers which in turn hinder migration of lithium ions and electrons, thus resulting in deterioration of the battery performance. Whereas, the binder of the present invention, due to incorporation of carbon nanotubes having a superior electrical conductivity into the binder, is characterized by a capability to ensure the inherent conductivity of the binder.

FIG. 1 shows a schematic cross-sectional view of an anode to which a binder according to one embodiment of the present invention is applied, in conjunction with an enlarged view illustrating a detailed structure of the binder. As shown in FIG. 1, an anode 100 is composed of a nanocomposite binder 130 made of a polymerizable material or polymer 131 and carbon nanotubes 132, an anode active material 120 and an anode current collector 110. Upon scrutinizing the detailed structure of the nanocomposite binder 130, the carbon nanotubes 132 are interposed between the polymerized polymers 131 of photo- or thermo-polymerizable monomers, oligomers, low-molecular weight polymers or mixtures thereof, or the carbon nanotubes 132 are captured between the polymers 131 via physical or chemical bonding, thereby forming a nanocomposite binder having high mechanical strength.

Hereinafter, the nanocomposite binder of the present invention will be described in more detail, according to the individual components and manufacturing steps.

The carbon nanotubes that can be used in the present invention are not particularly limited and for example, include single-walled carbon nanotubes (SWNTs), multi-walled carbon nanotubes (MWNTs) and the like, which may be prepared by any conventional process such as arc-discharge, laser vaporization, chemical vapor deposition (CVD) and high pressure decomposition of carbon monoxide (HiPCO). In addition, both metallic and semiconducting carbon nanotubes may be used, even though it is preferred to use metallic ones. Therefore, it is not necessarily to perform separation of the metallic carbon nanotubes from the semiconducting carbon nanotubes.

Generally, metallic catalyst components or particulate carbon components remain after preparation of the carbon nanotubes. Such remaining materials may cause side reactions having adverse effects on the reaction mechanism of the battery or may inhibit miscibility with binder components. Therefore, it is preferred to remove such residues prior to mixing with the binder components.

The carbon nanotubes usually have a varying purity of about 30 to 100% by weight and they are thus preferably purified to have a purity of more than 90% by weight through a subsequent purification process. In order to remove transition metals used as a catalyst in preparation of the carbon nanotubes, such as iron, nickel and cobalt, amorphous carbon, carbon nanoparticles such as fullerenes, and carbon-containing materials, any conventional methods such as liquid-phase oxidation, gas-phase oxidation, filtration, centrifugation and chromatography may be employed.

The carbon nanotubes may be dispersed in the binder components by various methods such as mechanical mixing, with or without a pre-treatment process such as UV ozone treatment or acid treatment. Specifically, UV ozone treatment or acid treatment is carried out on the carbon nanotubes, thereby introducing functional groups such as carboxyl groups into ends or surfaces thereof, and may be then mixed with binder components such as polymerizable materials (for example, monomers, oligomers, low-molecular weight polymers and the like) or polymers. Such a pre-treatment process may impart superior physical properties to the binder by induction of physical or chemical bonding between the carbon nanotubes and binder components.

As an example of the acid treatment method, the carbon nanotubes are first introduced to concentrated sulfuric acid, nitric acid or a mixture thereof, followed by ultrasonic reflux at room temperature for 1 to 96 hours. Preferably, reflux is carried out for less than 2 hours to maintain a length of carbon nanotubes and minimize occurrence of lattice defects on surfaces of carbon nanotubes, such that superior mechanical properties of the carbon nanotubes can be exerted intact even in the resulting nanocomposite. After performing ultrasonic reflux, the resulting products are filtered through a polycarbonate filter having a pore diameter of less than 0.25 µm, washed with distilled water and thoroughly dried at room temperature to 80° C., preferably at about 60° C.

The acid treated carbon nanotubes are dispersed in a solvent such as distilled water, dimethylformaldehyde, dimethylsulfoxide or methylethylketone, and then subjected to forced reflux in an ultrasonic reactor for 5 min to 2 hours, preferably about 1 hour, such that the acid-treated carbon nanotubes are homogeneously dispersed in the solvent.

Next, the photo- or thermo-polymerizable material or polymer is added to the resulting solution which is then refluxed for another one hour. As to the composition of the carbon nanotube-polymerizable material, the carbon nanotubes are contained preferably in an amount of 0.01 to 20% by weight, and more preferably less than 5% by weight, based on the total weight of the binder. As compared to when the carbon nanotubes are used as the binder of the electrode mix in some conventional arts, the present invention exhibits a significant difference in the magnitude of the carbon nanotubes accounting for production costs of the battery, due to a significant decrease in absolute amounts of carbon nanotubes added to the battery.

As discussed hereinbefore, the photo- or thermo-polymerizable material, which is a component capable of forming a composite with the carbon nanotubes in the present invention, includes any kind of monomers, oligomers, low-molecular weight polymers and mixtures thereof which are polymerizable by light irradiation and/or heat treatment. Details of these materials will be given as follows.

First, examples of the polymerizable monomer include, but are not limited to, epoxy-, urethane-, acrylate-, silicon-, hydroxyl-based monomers and acrylic derivatives which may be used alone or in any combination thereof. Polymerization of these materials is initiated with light irradiation or heat treatment. The polymerizable oligomer is a polymerization product of about 2 to 25 monomers and may be formed into polymers having a higher degree of polymerization by light irradiation or heat treatment. The polymerizable, low-molecular weight polymer refers to a linear polymer, a cross-linked polymer or the like, having a low degree of polymerization or a low viscosity, and includes, but is not limited to, polyester acrylate, epoxy acrylate, urethane acrylate and polyurethane.

Polymerization as used herein refers to a reaction that can produce binding force between active materials and/or between the active material and current collector, by solidification of the materials concerned, and is a concept covering both polymerization and cross-linking.

In addition, the polymer, which is another component capable of forming a composite with the carbon nanotubes in the present invention, refers to a polymer which forms a nanocomposite with the carbon nanotubes, without undergoing polymerization or cross-linking. Examples of the polymer that can be used in the present invention include, but are not limited to, polyvinyl alcohol, polyvinylidene fluoride, fluorocopolymers such as compolymer of vinylidene fluoride and hexafluoroethylene, polyimide, polyacrylic acid and styrene butadiene rubber.

Such a nanocomposite as described above may be used as the binder for the electrode mix, in fabrication of the battery. Preferably, the nanocomposite may be mixed with a silicon-, tin- or graphite-based anode active material to form the anode of the lithium battery. Particularly, the nanocomposite of the present invention may be preferably used in secondary batteries utilizing the silicon- or tin-based anode active material having a large capacity but undergoing significant volume changes during repeated charge/discharge cycles.

The term "silicon- or tin-based anode active material" is intended to encompass silicon (Si) particles, tin (Sn) particles, silicon-tin alloy particles, silicon alloy particles, tin alloy particles, composites thereof and the like. Representative examples of the silicon alloys include, but are not limited to, solid solutions, intermetallic compounds and eutectic alloys of Al—Si, Mn—Si, Fe—Si and Ti—Si. As one preferred example of the composite, a silicon/graphite composite may be used and is found in International Publication No. WO 2005/011030, assigned to the present applicant, the disclosures of which are incorporated by reference herein in their entirety. The graphite may be natural or artificial graphite. In addition, the form of graphite is not particularly limited and may be amorphous, plate-like, flaky or grain-like.

Preferably, the above nanocomposite as the binder may be added to the anode mix. The nanocomposite may be contained in an amount of about 1 to 50% by weight, preferably 2 to 20% by weight, based on the total weight of the anode mix. If the content of the nanocomposite is too low, it is difficult to exert the capability of the binder to withstand volume changes occurring during charge/discharge cycles. On the other hand, if the content of the nanocomposite is too high, this undesirably leads to decreased capacity and increased resistance of the anode.

In the present invention, the anode mix may further include a photoinitiator or thermal initiator as a catalyst. The photoinitiator that can be used in the present invention may be a radical photoinitiator producing radicals and a cationic photoinitiator producing cations. Examples of the radical photoinitiator may include, but are not limited to, dialkoxyacetophenone, benzilketal, hydroxyalkylphenyl ketone, benzoyl oxime ester and amino ketone. Examples of the cationic photoinitiator may include, but are not limited to, onium salts, typically dialkyliodonium salt and triarylsulfonium salt.

The thermal initiator that can be used in the present invention may be a material which is capable of producing radicals by the action of heat, preferably capable of producing radicals at a relatively low temperature of less than 200° C. Examples of the thermal initiator may include, but are not limited to, benzoyl peroxide, potassium persulfate and azobisisobutyronitrile.

The photoinitiators and thermal initiators may be independently used alone or in any combination thereof. Further, mixtures of the photoinitiators and thermal initiators may also be used. In order to further enhance the efficiency of the initiator, a photosensitizer may be additionally used. The photosensitizer may include, but is not limited to, thioxanthone and amine.

As a light source used to decompose the photoinitiator, mention may be made of UV light, visible light, electron beam, X-ray, gamma-ray and laser beam.

In addition to the silicon-, tin- or graphite-based anode active material, nanocomposite binder and initiators as mentioned hereinbefore, the anode mix may further include other components such as a viscosity adjuster, a conductive material, a filler, a cross-linking accelerator, a coupling agent and an adhesive accelerator which are used alone or in any combination thereof.

The viscosity adjuster is a component used to adjust the viscosity of the anode mix, such that a mixing process of the anode mix and an application process of the anode mix to the current collector can be easily carried out. The viscosity adjuster may be added in an amount of 0 to 30% by weight, based on the total weight of the anode mix. Examples of the viscosity adjuster may include, but are not limited to, carboxymethyl cellulose, polyvinylidene fluoride and polyvinyl alcohol. Where appropriate, in order to adjust viscosity of the anode mix, a solvent such as N-methyl pyrrolidone (NMP) may be used in an amount of 0 to 30% by weight, based on the total weight of the anode mix. In this case, such a solvent is dried before or after the polymerization or curing process, thereby preparing an anode.

The conductive material is a component used to further improve the conductivity of the anode active material and may be added in an amount of 1 to 20% by weight, based on the total weight of the anode mix. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The filler is an optional ingredient used to inhibit anode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber.

The cross-linking accelerator is a material that facilitates cross-linking of the binder and may be added in an amount of 0 to 50% by weight, based on the weight of the binder. Examples of the cross-linking accelerator may include amines such as diethylene triamine, triethylene tetramine, diethylamino propylamine, xylene diamine and isophorone diamine, and acid anhydrides such as dodecyl succinic anhydride and phthalic anhydride. Besides them, polyamide resins, polysulfide resins, phenolic resins and the like may also be used as the cross-linking accelerator.

The coupling agent is a material used to increase adhesive strength between the active material and binder, and is characterized by having two or more functional groups. The coupling agent may be added in an amount of 0 to 30% by weight, based on the weight of the binder. There is no particular limit to the coupling agent, so long as it is a material in which one functional group forms a chemical bond via reaction with a hydroxyl or carboxyl group present on the surface of the silicon-, tin- or graphite-based active material, and the other functional group forms a chemical bond via reaction with the nanocomposite according to the present invention. Examples of the coupling agent that can be used in the present invention may include silane-based coupling agents such as triethoxysilylpropyl tetrasulfide, mercaptopropyl triethoxysilane, aminopropyl triethoxysilane, chloropropyl triethoxysilane, vinyl triethoxysilane, methacryloxypropyl triethoxysilane, glycidoxypropyl triethoxysilane, isocyanatopropyl triethoxysilane and cyanatopropyl triethoxysilane.

The adhesive accelerator may be added in an amount of less than 10% by weight, based on the weight of the binder. There is no particular limit to the adhesive accelerator, so long as it is a material that improves adhesive strength of the anode active material to the current collector. Examples of the adhesive accelerator that can be used in the present invention may include oxalic acid, adipic acid, formic acid, acrylic acid derivatives, itaconic acid derivatives and the like.

The secondary battery according to the present invention is fabricated by applying the anode mix to the current collector, followed by rolling, drying and curing.

The anode current collector is generally fabricated to have a thickness of 3 to 500 µm. There is no particular limit to the anode current collector, so long as it has suitable conductivity without causing chemical changes in the fabricated battery. As examples of the anode current collector, mention may be made of copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be fabricated to form fine irregularities on the surface thereof so as to enhance adhesive strength to the anode active material. In addition, the anode current collector may take various forms including films, sheets, foils, nets, porous structures, foams and non-woven fabrics.

Hereinafter, the other remaining components necessary for the lithium secondary battery according to the present invention will be described in more detail. The lithium secondary battery is comprised of the anode fabricated as above, a cathode, a separator and a non-aqueous electrolyte containing a lithium salt.

The cathode is, for example, fabricated by applying a mixture of the cathode active material, a conductive material and a binder to a cathode current collector, followed by drying. If desired, a filler may be further added to the above mixture.

Examples of the cathode active material that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $V_2O_5$ and $Cu_2V_2O_7$; Ni-site type lithiated nickel oxides of Formula $LiNi_{1-x}M_xO_2$ (M=Co, Mn, Al, Cu, Fe, Mg, B or Ga, and $0.1 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is substituted with alkaline earth metal ions; disulfide compounds; and $LiFe_3O_4$ and $Fe_2(MoO_4)_3$.

The cathode current collector is generally fabricated to have a thickness of 3 to 500 µm. There is no particular limit to the cathode current collector, so long as it has high conductivity without causing chemical changes in the fabricated battery. As examples of the cathode current collector, mention may be made of stainless steel, aluminum, nickel, titanium, sintered carbon and aluminum or stainless steel which was surface-treated with carbon, nickel, titanium or silver. The current collector may be fabricated to have fine irregularities on the surface thereof so as to enhance adhesive strength to the cathode active material. In addition, the current collector may take various forms including films, sheets, foils, nets, porous structures, foams and non-woven fabrics.

The binder for the cathode active material is a component assisting in binding between the active material and conductive material, and in binding with the current collector. The binder utilized in the present invention is typically added in an amount of 1 to 50% by weight, based on the total weight of the cathode mix. As examples of the binder, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

Details of other conductive materials and fillers were the same as in the anode.

The separator is interposed between the cathode and anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and lithium. As the non-aqueous electrolyte, a non-aqueous electrolytic solution, solid electrolyte and inorganic solid electrolyte may be utilized.

As the non-aqueous electrolytic solution that can be used in the present invention, for example, mention may be made of non-protic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulphates of lithium such as $Li_3N$, $LiI$, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$ and $Li_3PO_4-Li_2S-SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}C_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

EXAMPLES

Now, the present invention will be described in more detail with reference to the following examples. These examples are provided only for illustrating the present invention and should not be construed as limiting the scope and spirit of the present invention.

Example 1

Predetermined amounts of multi-walled carbon nanotubes (MWNTs) were pre-treated using a UV ozone generator. In order to achieve uniform UV-contact effects during UV ozone treatment, after being irradiated with UV light for 20 min, the carbon nanotube sample was re-dispersed using a spatula. By repeating this procedure, the carbon nanotubes were subjected to UV ozone treatment for 180 min, and the treated carbon nanotubes were then dispersed in dimethyl sulfoxide.

On the other hand, 5% by weight of a polyvinyl alcohol having a degree of polymerization (DP) of 4000 and a degree of saponification (DS) of more than 99% was dissolved in dimethyl sulfoxide. The resulting solution was mixed with the above MWNTs-containing solution such that MWNTs were homogeneously dispersed in the polyvinyl alcohol. Herein, MWNTs were used in an amount of 1% by weight, based on the weight of the polyvinyl alcohol. The resulting mixed solution was coated to a thickness of 500 μm on copper foil using a doctor blade, and was dried at 130° C. for 2 hours. Thereafter, the copper foil was removed to fabricate a polymer film.

Example 2

A polymer film was fabricated in the same manner as in Example 1, except that multi-walled carbon nanotubes (MWNTs) were added in an amount of 5% by weight, based on the weight of the polyvinyl alcohol.

Comparative Example 1

5% by weight of a polyvinyl alcohol having a degree of polymerization (DP) of 4000 and a degree of saponification (DS) of more than 99% was dissolved in dimethyl sulfoxide, and a polymer film was then fabricated in the same manner as in Example 1.

Example 3

85 g of a silicon-graphite composite active material, 13 g of a composite binder containing the multi-walled carbon nanotubes (MWNTs) of Example 1 in an amount of 1% by weight, based on the weight of a polyvinyl alcohol having a degree of polymerization (DP) of 4000 and a degree of saponification (DS) of more than 99%, and 2 g of carbon black as a conductive material were mixed in dimethyl sulfoxide as a solvent, and the total content of solids was adjusted to 30% by weight, thereby preparing a slurry. The resulting slurry was coated to a thickness of 100 μm on copper foil using a doctor blade, and was dried in a drying oven at 130° C. for 30 min, followed by rolling it to an appropriate thickness to thereby fabricate an anode.

Example 4

An anode was fabricated in the same manner as in Example 3, except that multi-walled carbon nanotubes (MWNTs) were added in an amount of 5% by weight, based on the weight of the polyvinyl alcohol.

Comparative Example 2

An anode was fabricated in the same manner as in Example 3, except that 13% by weight of a polyvinyl alcohol having a degree of polymerization (DP) of 4000 and a degree of saponification (DS) of more than 99% was used as a binder, instead of a composite binder.

Example 5

94 g of $LiCoO_2$ as an active material, 1.0 g of a conductive polymer and 5.0 g of a PVDF binder were mixed in NMP as a dispersion medium, and the total content of solids was adjusted to 45% by weight, thereby preparing a slurry. The resulting slurry was coated to a thickness of 100 μm on aluminum foil using a doctor blade, and was dried in a drying oven at 130° C. for 30 min, followed by rolling it to an appropriate thickness to thereby fabricate a cathode.

A separator made of a microporous polyolefin film was interposed between the anode of Example 3 and the cathode fabricated as above, thereby fabricating a coin cell. Thereafter, an electrolyte of 1M $LiPF_6$ in a mixed solvent of EC (ethyl carbonate):DEC (diethyl carbonate):EMC (ethyl-methyl carbonate) (4:3:3, v/v) was added to the resulting electrode assembly to fabricate a lithium secondary battery.

Example 6

A lithium secondary battery was fabricated in the same manner as in Example 5, except that the anode fabricated in Example 4 was used.

Comparative Example 3

A lithium secondary battery was fabricated in the same manner as in Example 5, except that the anode fabricated in Comparative Example 2 was used.

Experimental Example 1

In order to measure the tensile strength and elongation for the polymer films of the present invention, experiments were carried out according to ASTM D638 standard test method. The results thus obtained are given in Table 1 below. For evaluation, the tensile strength and elongation were measured for more than 5 samples and the average value was calculated.

Experimental Example 2

Surface resistance for the polymer films of the present invention was measured. The experimental results thus obtained are given in Table 1 below.

TABLE 1

|  | Example 1 | Example 2 | Comp. Example 1 |
|---|---|---|---|
| Electrical resistance (Ω/□) | $10^6$ | $<10^0$ | $>10^{10}$ |
| Tensile strength (MPa) | 81.8 | 78.6 | 65.3 |
| Elongation (%) | 12.2 | 13.7 | 12.5 |

Experimental Example 3

In order to measure the adhesive strength between an electrode active material and current collector when the carbon nanotube-polymer composite of the present invention was used as a binder, the surface of the fabricated electrode was cut into a predetermined size and mounted on a slide glass. Then, the current collector was peeled off while 180-degree peel strength was measured. The results thus obtained are given in Table 2 below. For evaluation, the peel strength was measured for more than 5 samples and the average value was calculated.

TABLE 2

|  | Example 3 | Example 4 | Comp. Example 2 |
|---|---|---|---|
| Electrode adhesive strength (g/cm) | 1958 | 2132 | 1999 |

Experimental Example 4

In order to evaluate the performance of coin cell batteries, 2 cycles of charge/discharge at 0.1 C rate and 50 cycles of charge/discharge at 0.5 C rate were respectively repeated according to a constant-current/constant-voltage method. The initial capacity and efficiency, the efficiency after charge/discharge cycles, and the volume expansion were compared between the respective batteries. For this purpose, more than 5 coin cell batteries were respectively fabricated for the same binder composition, and evaluation was carried out and the average value was calculated. The results thus obtained are given in Table 3 below.

TABLE 3

|  | 1 cycle charge speed at (hr) | Electrode volume expansion after 50 cycles (%) | 50-cycle efficiency (%) |
|---|---|---|---|
| Example 5 | 11.5 | 418 | 76.6 |
| Example 6 | 10.4 | 393 | 78.4 |
| Comp. Example 3 | 13.6 | 496 | 68.5 |

As shown in Table 1 above, it was confirmed that the nanocomposite binder containing the carbon nanotubes (Examples 1 and 2) exhibits significant improvement of electrical conductivity as compared to a conventional binder (Comparative Example 1). Therefore, the charge/discharge time of the battery could be reduced (see Table 3). Further, it was confirmed that the volume expansion occurring during repeated charge/discharge processes of a high-capacity battery is decreased due to improved mechanical properties of the binder, and the battery performance is significantly improved due to decreased occurrence of cracks in the electrode (see Tables 1 and 3).

INDUSTRIAL APPLICABILITY

As apparent from the above description, a carbon nanotube-containing composite binder according to the present invention and a lithium secondary battery comprising the same are capable of maintaining stable adhesion between active materials and between the active material and current collector, despite significant volume changes of anode active materials occurring during repeated charge/discharge cycles, via the use of a nanocomposite composed of carbon nanotubes and other polymerizable materials or polymers as a binder of an anode mix. Due to a high conductivity intrinsic to the binder, the present invention enables commercialization of a high-capacity silicon- or tin-based anode active material, and it is therefore possible to manufacture a high-capacity lithium secondary battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A nanocomposite binder for an electrode mix of a secondary battery, the binder comprising:
   carbon nanotubes; and one or more organic components selected from
   a photo- and/or thermo-polymerizable material selected from epoxy-, urethane-, acrylate-, silicon-, hydroxyl-based monomers and acrylic derivatives,
   a low molecular weight polymer of the photo- and/or thermo-polymerizable material selected from polyvinyl alcohol, polyester acrylate, epoxy acrylate, urethane acrylate and polyurethane,
   a mixture of the photo- and/or thermo-polymerizable material and the low molecular weight polymer, and
   a polymer selected from polyvinyl alcohol, polyimide, polyacrylic acid, and styrene butadiene rubber,
   wherein individual carbon nanotubes of the carbon nanotubes are interposed between the polymers of the photo- and/or thermo-polymerizable material, wherein the individual carbon nanotubes are chemically bonded to the one or more organic components, and wherein the carbon nanotubes are contained in an amount of 0.01 to 20% by weight, based on the total weight of the binder.

2. The binder according to claim 1, wherein UV ozone treatment or acid treatment introduces functional groups including carboxyl groups into ends or surfaces of the carbon nanotubes which are then mixed with the polymerizable material or polymer.

3. The binder according to claim 1, wherein metallic components and particulate carbon components are removed from the carbon nanotubes, prior to mixing with the polymerizable material.

4. The binder according to claim 1, wherein the nanocomposite is a composite containing single-walled carbon nanotubes or multi-walled carbon nanotubes bound to a photo- or thermo-polymerizable or crosslinkable material or polymer, or a mixture thereof.

5. The binder according to claim 1, wherein the photo- and/or thermo-polymerizable material is a photo- and/or thermo-polymerizable monomer, oligomer, low-molecular weight polymer or mixture thereof;

the polymerizable monomer or oligomer is an epoxy-, urethane-, acrylate-, silicon-, or hydroxyl-based monomer or an acrylic derivative; and the polymerizable, low-molecular weight polymer is polyester acrylate, epoxy acrylate, urethane acrylate or polyurethane.

6. A lithium secondary battery comprising the nanocomposite binder of claim 1.

7. The battery according to claim 6, wherein the nanocomposite binder is incorporated into an anode mix.

8. The battery according to claim 7, wherein the anode mix is composed of a silicon- or tin-based anode active material.

9. The battery according to claim 7, wherein the anode mix is composed of a graphite-based anode active material.

10. The battery according to claim 8, wherein the silicon- or tin-based anode active material is silicon (Si) particles, tin (Sn) particles, silicon-tin alloy particles, silicon alloy particles, tin alloy particles, or a silicon/graphite or tin/graphite composite.

11. The battery according to claim 10, wherein the silicon alloy is a solid solution, intermetallic compound or eutectic alloy of Al—Si, Mn—Si, Fe—Si or Ti—Si.

12. The battery according to claim 6, wherein the electrode mix further includes a catalytic amount of a photoinitiator, a thermal initiator or a mixture thereof.

13. The battery according to claim 12, wherein the photoinitiator is a radical photoinitiator selected from dialkoxyacetophenone, benzilketal, hydroxyalkylphenyl ketone, benzoyl oxime ester and amino ketone, and/or a cationic photoinitiator such as an onium salt selected from a dialkyliodonium salt and a triarylsulfonium salt; and the thermal initiator is benzoyl peroxide, azobisisobutyronitrile or potassium persulfate.

14. The battery according to claim 6, wherein a crosslinking accelerator, a coupling agent, an adhesive accelerator or any combination thereof is further included, which improves a crosslinking degree and an adhesive strength of the nanocomposite.

15. A lithium secondary battery, comprising:

an anode, the anode comprising an anode active material comprising a silicon-based anode active material, a tin-based anode active material or a graphite-based anode active material, and a binder comprising carbon nanotubes, and one or more organic components selected from a photo- and/or thermo-polymerizable material selected from epoxy-, urethane-, acrylate-, silicon-, hydroxyl-based monomers and acrylic derivatives, a low molecular weight polymer of the photo- and/or thermo-polymerizable material selected from polyvinyl alcohol, polyester acrylate, epoxy acrylate, urethane acrylate and polyurethane, a mixture of the photo- and/or thermo-polymerizable material and the low molecular weight polymer, and a polymer selected from polyvinyl alcohol, polyimide, polyacrylic acid, and styrene butadiene rubber, wherein individual carbon nanotubes of the carbon nanotubes are interposed between and chemically bonded to the organics compounds, and wherein the carbon nanotubes are contained in an amount of 0.01 to 20% by weight, based on the total weight of the binder.

16. The lithium secondary battery of claim 15, wherein the silicon-based anode active material and tin-based anode active material includes silicon particles, tin particles, silicon-tin alloy particles, silicon alloy particles, tin alloy particles, composites thereof and the like and the graphite is natural graphite or artificial graphite.

17. A nanocomposite binder for an electrode mix of a secondary battery, the binder comprising:

carbon nanotubes; and polyvinyl alcohol, wherein individual carbon nanotubes of the carbon nanotubes are interposed between the polymers of the polyvinyl alcohol, wherein the individual carbon nanotubes are chemically bonded to the polymers of the polyvinyl alcohol, and wherein the carbon nanotubes are contained in an amount of 0.01 to 20% by weight, based on the total weight of the binder.

18. The binder according to claim 1, wherein the carbon nanotubes further comprise a carboxyl group on a surface thereof and wherein the carboxyl group is chemically bonded to the polymer.

19. A lithium secondary battery comprising an anode, the anode comprising an anode active material comprising a silicon-based anode active material, a tin-based anode active material or graphite-based anode active material, and the binder according to claim 17.

\* \* \* \* \*